United States Patent

[11] 3,587,073

[72] Inventors Sanjoy Ghose
San Jose;
Armin Kluth, Los Gatos, both of, Calif.

[21] Appl. No. 851,848
[22] Filed Aug. 21, 1969
[45] Patented June 22, 1971
[73] Assignee International Business Machines Corporation
Armonk, N.Y.

[54] CLAMP FOR ATTACHING MAGNETIC DISKS TO A HUB
4 Claims, 2 Drawing Figs.

[52] U.S. Cl. .......... 340/174.1R, 274/4 H, 340/174.1 C, 346/74 MD, 346/137
[51] Int. Cl. .......... G11b 5/82, G11b 25/04
[50] Field of Search .......... 340/174.1; 274/4, 10, 41.4; 179/100.2 A; 312/10, 11; 211/40, 58, 144, 148; 108/101, 94; 346/137, 74 MD

[56] References Cited

UNITED STATES PATENTS

| | | | |
|---|---|---|---|
| 3,509,992 | 5/1970 | David et al. | 346/137 |
| 3,258,126 | 6/1966 | Frey | 312/10 |
| 3,304,527 | 2/1967 | Marrs et al. | 179/100.2 |
| 3,373,414 | 3/1968 | Carter | 340/174.1 |

*Primary Examiner*—Bernard Konick
*Assistant Examiner*—Vincent P. Canney
*Attorneys*—Hanifin and Jancin and Nathan N. Kallman

ABSTRACT: A magnetic storage disc assembly comprises a cylindrical hub, to which a multiplicity of discs and interleaved spacer rings are mounted coaxially. The hub is connected to a rotary drive spindle, whereby the discs may be rotated relative to magnetic heads. The discs and spacer rings are mechanically fastened to the hub, and a flexible ring clamps the discs and spacers together with a uniform pressure.

*INVENTORS.*
SANJOY GHOSE
ARMIN KLUTH

*BY* Nathan N. Kallman
ATTORNEY

CLAMP FOR ATTACHING MAGNETIC DISKS TO A HUB

BACKGROUND OF THE INVENTION

1. Field of the Invention

This invention relates to a novel and improved magnetic disc pack assembly, such as may be used in a fixed head file.

2. Description of the Prior Art

Magnetic disc storage files are utilized for storing high density data and to enable rapid data retrieval. To afford high capacity, disc packs including a multiplicity of concentrically aligned discs are employed. With high density data systems, wherein relatively narrow data tracks are used, and the bits are registered in closely spaced discrete areas, it is necessary that the discs maintain a substantially parallel relationship to afford proper transducing between the sensing heads and the record surfaces. If not, problems of skew, missing data bits, bit shift, signal distortion and the like will be experienced. It is apparent that mechanical tolerances, among other things, are critical when assembling a stack of discs.

One problem that arises during such disc pack assembly is that the applied clamping force used to clamp the discs together is not uniformly distributed, and therefore results in disc runout and deflection, particularly for the outermost discs of the pack. It has been observed that variations in clamping pressure cause an unduly large runout, which results in data errors during operation of the disc file. Also, cumulative errors in spacing and tilt of the discs affect the accuracy of the data recording and readout.

SUMMARY OF THE INVENTION

An object of this invention is to provide an improved disc pack assembly, wherein the discs are maintained in substantially parallel relationship and static and dynamic runout are minimized.

Another object of this invention is to provide a disc pack assembly having improved means for mechanically assembling and clamping the discs in a stack.

In an embodiment of this invention, a disc pack assembly comprises a cylindrical hub structure, having an external collar located centrally on the hub cylinder wall. A like number of magnetic discs are mounted on each side of the collar to the hub, and between each pair of discs, a spacer ring is positioned. The assembly is clamped together by means of flexible clamping rings that are fastened to the ends of the disc assembly. The flexible clamps are made of a thin, yieldable material, such as aluminum, and have a configuration which acts to absorb the torque forces applied by fastening the stack of discs and spacer rings together.

BRIEF DESCRIPTION OF THE DRAWINGS

The invention will be described in greater detail with reference to the drawing in which.

Similar numerals refer to similar elements throughout the drawing.

DESCRIPTION OF THE PREFERRED EMBODIMENT

Figure 1:
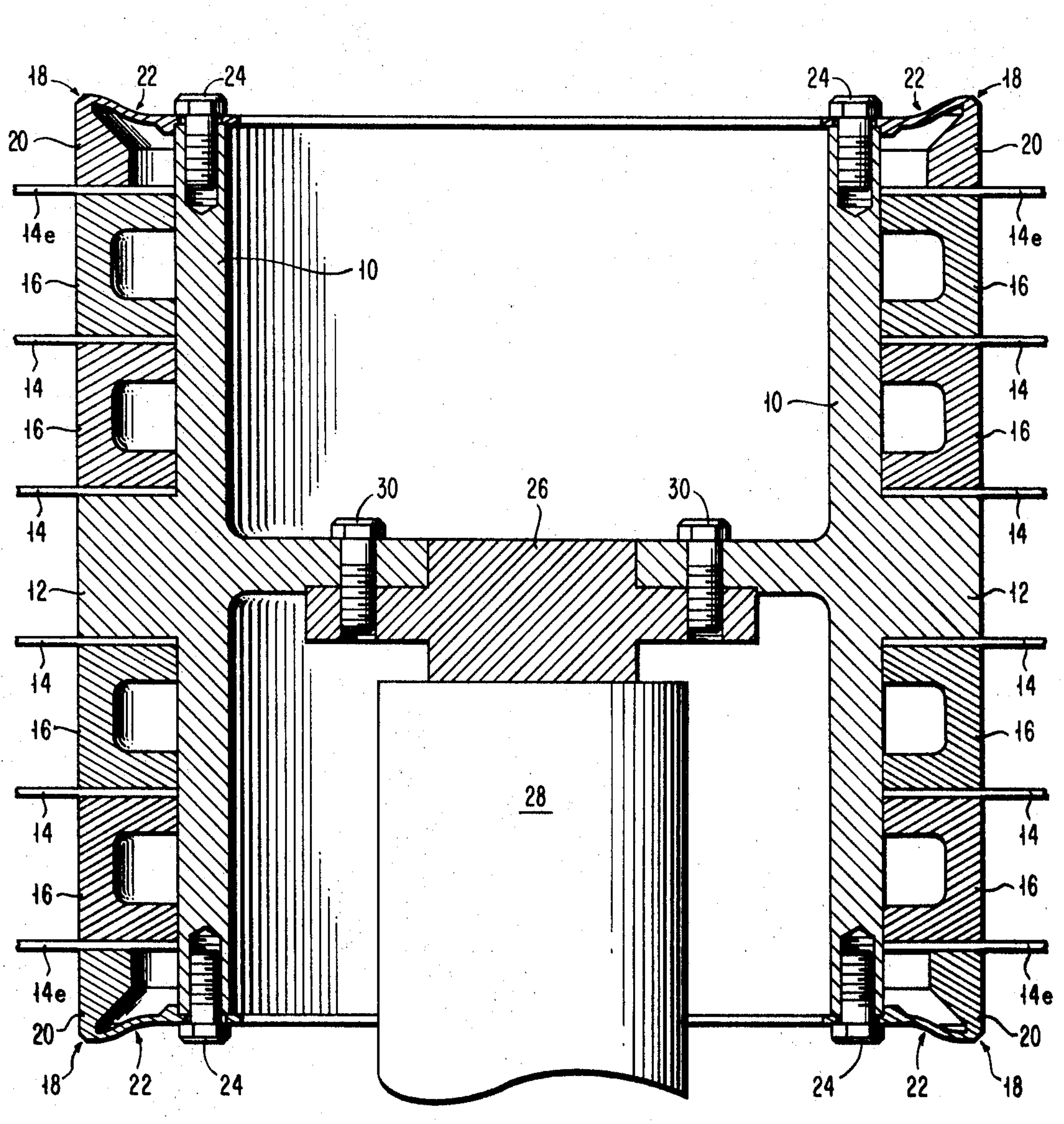
FIG. 1 is an elevational view, in section, of a magnetic disc pack assembly, in accordance with this invention.

With reference to the drawing, a magnetic storage disc assembly incorporates a cylindrical hub structure 10 having an annular collar portion 12 extending from the central portion of the hub cylindrical wall. Magnetic discs 14 and spacer rings 16 are alternately seated on both surfaces of the collar 12, the spacer rings being sandwiched between the discs. Six discs and four spacers are shown by way of example. The discs 14 may be of the conventional type, such as magnetic oxide coated aluminum substrates, of 14 inches diameter; whereas the spacers may be made of extruded aluminum, and have the same outside diameter as the hub collar 12, which may be 8½ inches, for example.

The spacer rings 16 are of smaller diameter than the magnetic discs 14, which are shown partly broken away for convenience, thereby providing sufficient surface of each disc for recording purposes. The magnetic head structures which cooperate with the disc surfaces are not shown, since they are not part of this invention and require no description.

When the desired number of discs 14 are aligned on the collar 12, annular flexible clamps 18 are seated against the outer surfaces of the end discs **14*e*. A seating portion 20 of each clamp 18 is formed as a relatively thick rigid section that is configured orthogonally to a thin flexible shoulder portion 22. The thin shoulder portion 22 has an aperture for accommodating a fastening bolt 24, which is threaded to engage a threaded recess in the hub 10**.

Figure 2:
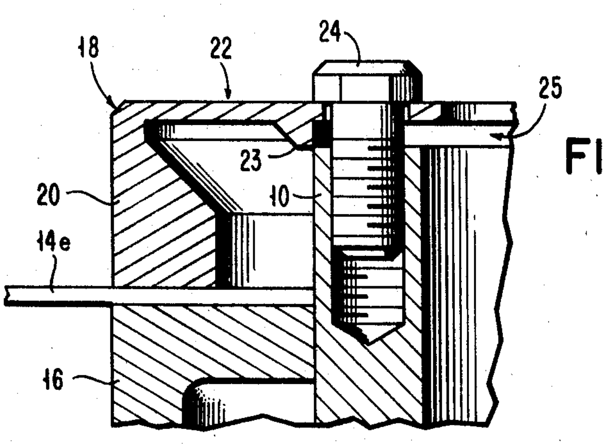
FIG. 2 is a partial sectional view of a portion of the disc assembly, as it appears prior to fastening of the flexible clamps.

When first seated, the clamping ring shoulder portion 22 is slightly spaced from the base of the cylindrical hub 10, as illustrated in FIG. 2. The predetermined clamping gap 25 permits accurate control of the clamping force, and prevents this force from exceeding a value at which distortion or warping of the discs could result during assembly. With the pilot or guide portion 23 engaged with the hub 10, the bolt 24 is tightened, so that the flexible shoulder 22 is depressed and its flat surface is bent into an arcuate shape. The bolt 24 is tightened until the shoulder portion 22 adjacent to that bolt contacts the hub structure. When all the bolts 24 are so fastened, the entire assembly of discs and spacers is securely mounted to the hub. In one embodiment of the invention, six bolts are disposed circumferentially about the peripheral base at each end of the hub structure. The clamping rings are made from commercially available aluminum 6061T6, with a yield strength which can withstand a stress of 30,000 pounds per square inch.

Since the clamping rings have the characteristic of flexibility, the torque forces that are applied by tightening the bolts and the rings against the outer discs are effectively minimized.

For use in a disc file the hub, disc, spacer, and clamp assembly is attached to a rotary drive spindle 26, which is coupled to a drive means 28 by locking means 30. This apparatus is located within the disc drive area of a storage file for transducing cooperation with magnetic head assemblies.

A feature of this invention is the use of the flexible clamps, which achieve a uniform clamping pressure over a wide range of applied loads. The flexible aluminum material used, and the configuration of a sturdy and rigid seating portion and a flexible shoulder portion enable the absorbing of screw torque and virtually eliminates variations in disc runout. The disc and spacer assembly with a centrally located hub collar affords a mechanically balanced drive operation, so that parallelism of the discs is maintained during high speed rotation relative to each other and to the head assemblies positioned adjacent to each disc surface.

While the invention has been particularly shown and described with reference to a preferred embodiment thereof, it will be understood by those skilled in the art that various changes in the form and details may be made therein without departing from the spirit and scope of the invention.

What we claim is:

1. An assembly of discs comprising:
   a hub for supporting a stack of discs in parallelism;
   a multiplicity of spacers disposed between said discs;
   means for securing said discs and spacers to said hub; and
   a clamping ring having a rigid portion for seating against the outermost discs of the assembly and a flexible portion disposed orthogonally to said rigid portion for fastening to said hub, said ring controlling the clamping force and absorbing the torque applied by said securing means when securing said discs and spacers to said hub.

2. An assembly of discs comprising:
   a cylindrical hub for supporting a stack of discs in parallelism and having a collar portion centrally located on its outer wall;
   a multiplicity of spacers disposed between said discs;
   means for securing said discs and spacers to said hub; and
   clamping means disposed between said securing means and said hub for controlling the clamping force resulting from the torque applied by said securing means.

3. An assembly as in claim 2, wherein the outside diameters of said collar, spacers, and clamping means are substantially the same.

4. An assembly as in claim 2, wherein said spacers have an outside diameter no larger than said collar, and said discs have an outside diameter substantially greater than said spacers to provide an extensive recording surface.